United States Patent
Otaka (10) Patent No.: US 7,107,035 B2
(45) Date of Patent: Sep. 12, 2006

(54) FREQUENCY CONVERTER AND RADIO COMMUNICATION APPARATUS

(75) Inventor: Shoji Otaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 412 days.

(21) Appl. No.: 10/669,411

(22) Filed: Sep. 25, 2003

(65) Prior Publication Data

US 2004/0116093 A1 Jun. 17, 2004

(30) Foreign Application Priority Data

Sep. 26, 2002 (JP) ............................. 2002-280739
May 29, 2003 (JP) ............................. 2003-152081

(51) Int. Cl.
*H04B 1/26* (2006.01)
(52) U.S. Cl. .................. 455/323; 455/307; 455/311
(58) Field of Classification Search ................ 455/327, 455/333, 326, 323, 313, 296, 307, 311
See application file for complete search history.

(56) References Cited

U.S. PATENT DOCUMENTS

| | | | |
|---|---|---|---|
| 5,379,457 A * | 1/1995 | Nguyen ...................... 455/323 |
| 6,026,286 A * | 2/2000 | Long ........................... 455/327 |
| 6,230,001 B1 * | 5/2001 | Wyse .......................... 455/326 |
| 6,529,721 B1 * | 3/2003 | Tiller .......................... 455/323 |
| 6,653,885 B1 * | 11/2003 | Wu et al. .................... 327/356 |
| 6,665,527 B1 * | 12/2003 | Schiltz ........................ 455/326 |
| 6,704,559 B1 * | 3/2004 | Hageraats ................... 455/326 |
| 6,819,914 B1 * | 11/2004 | Yan et al. ................... 455/318 |

OTHER PUBLICATIONS

A. Zolfaghari, et al., "A 2.4GHZ 34Mw CMOS Transceiver for Frequency-Hopping and Direct-Sequence Applications,", ISSCC 2001 Digest, pp. 418-419.
K. L. Fong, et al., Monolithic RF Active Mixer Design, IEEE Tranactions on Circuits and Systems-II: Analog and Digital Signal Processing. vol. 46, No. 3, Mar. 1999, pp. 231-239.

* cited by examiner

*Primary Examiner*—Edward F. Urban
*Assistant Examiner*—Blane J. Jackson
(74) *Attorney, Agent, or Firm*—Oblon, Spivak, McClelland, Maier & Neustadt, P.C.

(57) ABSTRACT

A frequency converter comprises an impedance matching unit connected to a current switching stage and a transconductance amplifier stage. The impedance matching unit has an impedance for conjugate power match. For example, the impedance matching unit is a parallel resonant circuit that includes an inductor and a capacitor that are formed as an integrated circuit. Thus, the frequency converter that has high conversion gain and low noise is obtained.

12 Claims, 9 Drawing Sheets

FREQUENCY CONVERTER AND RADIO COMMUNICATION APPARATUS

CROSS-REFERENCE TO RELATED APPLICATIONS

This application is based upon and claims the benefit of priority from the prior Japanese Patent Applications No. 2002-280739 filed on Sep. 26, 2002 and No. 2003-152081 filed on May 29, 2003 the entire contents of which are incorporated herein by reference.

BACKGROUND OF THE INVENTION

1) Field of the Invention

The present invention relates to an improvement in a frequency converter. This invention also relates to a radio communication apparatus that employs the frequency converter as an up-converter or a down-converter.

2) Description of the Related Art

Information devices, employing radio communications such as mobile phones and portable information devices, have recently attracted increasing research and development. Because of such research and development, the information devices are day-by-day becoming smaller and cheaper.

The information device becomes smaller or cheaper if analog radio frequency (RF) circuits in the information devices are made as integrated circuits. Frequency converters, such as single balanced mixers and double balanced mixers are the examples of such analog RF circuits. These type of mixers have been disclosed, for example, in "Monolithic RF Active Mixer Design", K. L. Fong and R. G. Meyer, IEEE Transactions on circuits and systems-II: Analog and digital signal processing, vol. 46, No. 3, March 1999, pp. 231–239.

The mixers described in this document include a driver stage and a switching stage. If such mixers are used in a frequency converter, it is necessary to set a condition of conjugate power match in order to obtain the available maximum power for analog circuits such as a frequency converter. However, in the frequency converter that employs such mixers, such condition is not met since the driver stage and the switching stage have mainly capacitive load (−jX, where X is a positive number) in a high frequency.

As a result, the frequency converters that employ the mixers described in the document have poor conversion gain.

SUMMARY OF THE INVENTION

It is an object of the present invention to provide a frequency converter and a radio communication apparatus that have high conversion gain and low noise figure.

The frequency converter according to the embodiments of the present invention comprises a transconductance unit that outputs a first output signal based on an input signal having a first frequency; an impedance matching unit that includes at least one inductor through which the first output signal passes; and a current switching unit that converts the first output signal output from the impedance matching unit to a second output signal having a second frequency based on a local oscillator signal.

The frequency converter according to the embodiments of the present invention comprises a first transconductance unit that outputs a first output signal based on a first input signal having a first frequency; a first impedance matching unit that includes at least one first inductor through which the first output signal passes; a first current switching unit that converts the first output signal output from the first impedance matching unit to a second output signal having a second frequency based on a local oscillator signal; a second transconductance unit that outputs a third output signal based on a second input signal having a phase that is opposite to a phase of the first input signal; a second impedance matching unit that includes at least one second inductor through which the third output signal passes; and a second current switching unit that converts the third output signal output from the second impedance matching unit to the second output signal based on the local oscillator signal.

The radio communication apparatus according to the embodiments of the present invention employs the frequency converter according to the present invention.

DETAILED DESCRIPTION

Exemplary embodiments of the frequency converter and the radio communication apparatus relating to the present invention are explained in detail below with reference to the accompanying drawings.

The frequency converter relating to the present invention is characterized by comprising an impedance matching unit, in addition to the conventional mixer.

Figure 1:
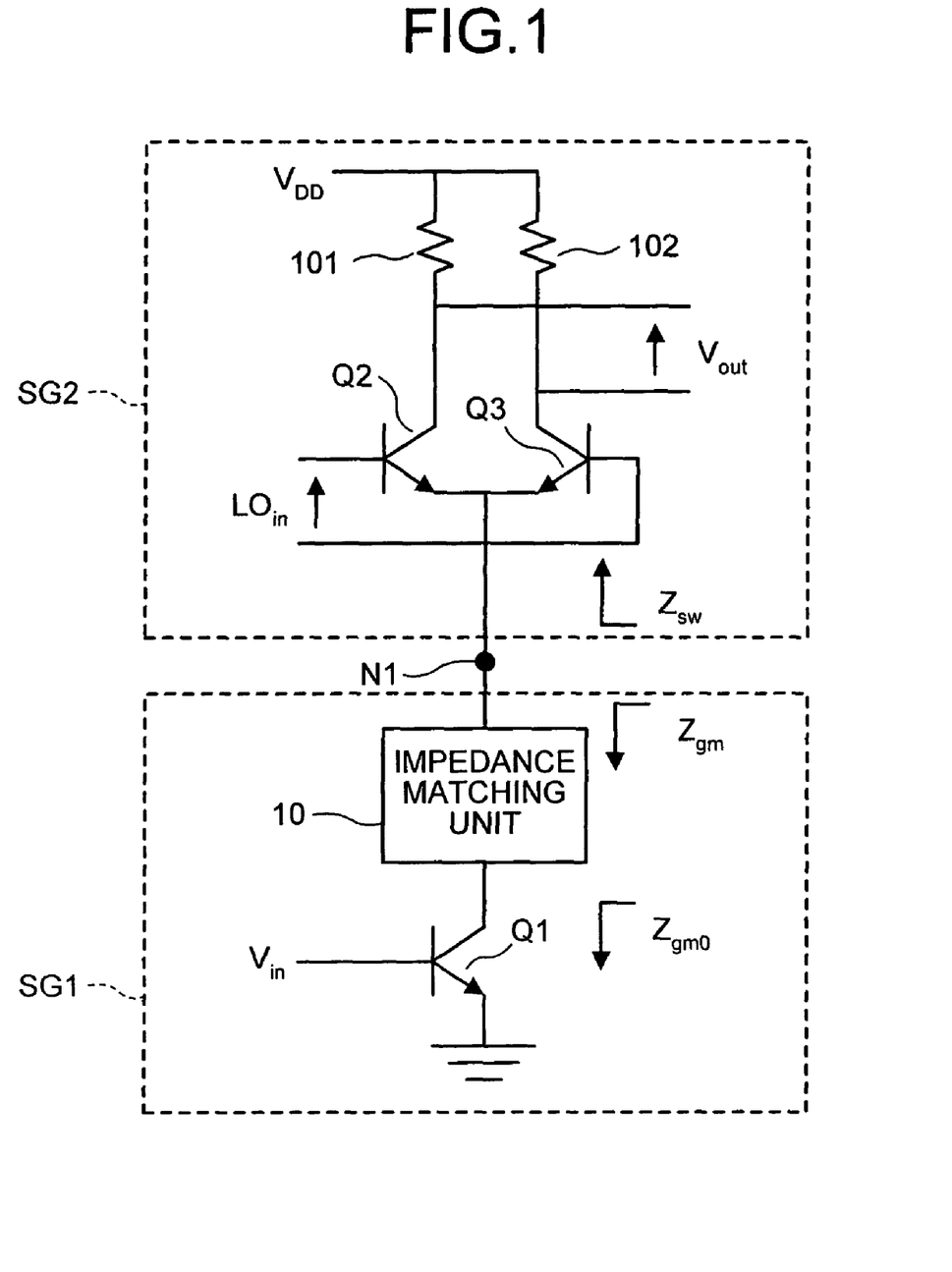
FIG. 1 is a circuit diagram of a frequency converter, which functions as a single balanced mixer, according to one embodiment of the present invention.

FIG. 1 is a circuit diagram of the frequency converter according to one embodiment of the present invention. An impedance matching unit 10 is provided in the conventional single balanced mixer. The impedance matching unit 10 is connected between the collector of an NPN transistor Q1 and the emitters (hereinafter, "switch emitter") of NPN transistors Q2 and Q3. The impedance matching unit 10 has inductive degeneration, and concretely comprises at least one inductor formed as an integrated circuit (IC).

The frequency converter shown in FIG. 1 may be divided into two stages at the junction (a node N1 in FIG. 1) between the impedance matching unit 10 and the switch emitter of the transistors Q2 and Q3. The first stage is a transconductance amplifier stage SG1 that includes the impedance matching unit 10 and the transistor Q1. The second stage is a current switching stage SG2 that includes the transistors Q2, Q3, and resistors 101, 102.

The operation of the frequency converter, when it is employed as a down-converter, will now be explained. In FIG. 1, an input signal $V_{in}$ is an RF signal and an output signal $V_{out}$ is an intermediate frequency (IF) signal.

The input signal $V_{in}$ is input to the base of the transistor Q1. The transistor Q1 works as the transconductance amplifier and allows current $I_{in}$ that is directly proportional to the input signal $V_{in}$ to flow between the collector and the emitter. The current $I_{in}$ flows through the impedance matching unit 10, the node N1, and the stage SG2. In the stage SG2, each base of transistors Q2 and Q3 receives a local oscillator signal $LO_{in}$. Thus, either the transistor Q2 or Q3 allows the current $I_{in}$ to flow between the collector and the emitter. Precisely, the transistors Q2 and Q3 operate a current switch by switching between passing or cutting off the current $I_{in}$ depending on the polarity of the local oscillator signal $LO_{in}$.

That is, when the base of the transistor Q2 has a potential higher than the base of the transistor Q3, the current $I_{in}$ flows from the collector of the transistor Q2 to the emitter of the transistor Q1 through the transistors Q2, Q1. On the other hand, when the base of the transistor Q3 is at a higher potential than the base of the transistors Q2, the current $I_{in}$ flows from the collector of the transistor Q3 to the emitter of the transistor Q1 through the transistors Q3, Q1.

Current $I_{out}$, which is the difference between the collector currents of the transistors Q2, Q3, can be expressed with the following equation:

$$I_{out} = k \cdot \cos(\omega_{RF} t) \cdot \cos(\omega_{LO} t) \quad (1)$$
$$= \frac{k}{2} \cdot \{\cos(\omega_{RF} - \omega_{LO})t + \cos(\omega_{RF} + \omega_{LO})t\},$$

where $\omega_{RF}$ is the angular frequency of the RF signal (that is, the input signal $V_{in}$), $\cos(\omega_{RF} t)$ is the current $I_{in}$, $\omega_{LO}$ is the angular frequency of the local oscillator signal $LO_{in}$, $\cos(\omega_{LO} t)$ is the local oscillator signal $LO_{in}$, and k is a constant of proportionality. The term $(\omega_{RF} - \omega_{LO})$ represents a desired IF signal, and the term $(\omega_{RF} + \omega_{LO})$ represents an unwanted signal.

The collector current of the transistor Q2 flows through the resistor 101 and thus it is converted into a collector potential. Similarly, the collector current of the transistor Q3 flows through the resistor 102 and thus is converted into a collector potential. As a result, the frequency converter outputs the output signal $V_{out}$ (the IF signal) that is the difference between these potentials.

In this manner, the frequency converter, when employed as a down-converter, converts the RF signal ($V_{in}$) down to the IF signal ($V_{out}$). On the other hand, if the IF signal is input to the base of the transistor Q1, the IF signal ($V_{in}$) is converted up to the RF signal ($V_{out}$) so that the frequency converter can be employed as an up-converter.

Figure 2A:
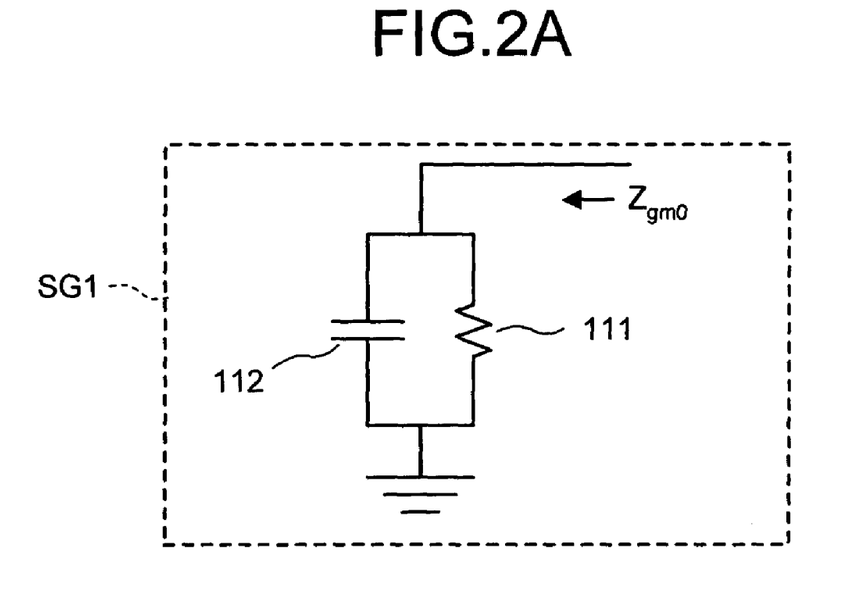
FIGS. 2A and 2B are equivalent circuit diagrams of a transconductance amplifier stage and a current switching stage of FIG. 1, respectively.

The output impedance $Z_{gm0}$ of the transistor Q1, when the collector is an output node, is represented approximately by the impedance of the circuit that is connections of a resistor 111 and a capacitor 112 in parallel, as shown in FIG. 2A. The resistor 111 and capacitor 112 are a parasitic resistor and a parasitic capacitor of the transistor Q1, respectively.

That is, the impedance $Z_{gm0}$ is given by:

$$Z_{gm0} \approx \frac{1}{j\omega C_{gm0} + \frac{1}{R_{gm0}}} = \frac{R_{gm0} - j\omega C_{gm0} R_{gm0}^2}{1 + \omega^2 C_{gm0}^2 R_{gm0}^2}, \quad (2)$$

where $R_{gm0}$ is the resistance of the parasitic resistor 111, $C_{gm0}$ is the capacitance of the parasitic capacitor 112, and $\omega$ is the angular frequency of the input signal $V_{in}$.

When the input signal $V_{in}$ has an angular frequency of $\omega_{RF}$, then a relationship between $\omega_{RF}$, $C_{gm0}$, and $R_{gm0}$ can be expressed as follows:

$$1 < \omega_{RF} C_{gm0} R_{gm0} \quad (3).$$

Therefore, the impedance $Z_{gm0}$ with respect to the input signal $V_{in}$ with the angular frequency $\omega_{RF}$, is derived from equations (2) as represented approximately by:

$$Z_{gm0} = \frac{1}{\omega_{RF} C_{gm0}} \cdot \frac{1}{\omega_{RF} C_{gm0} R_{gm0}} - j \cdot \frac{1}{\omega_{RF} C_{gm0}}. \quad (4)$$

While the imaginary part of this equation (4) is equivalent to the capacitive reactance of the parasitic capacitor 112, the real part indicates a value smaller than the absolute value of the capacitive reactance.

Figure 2B:
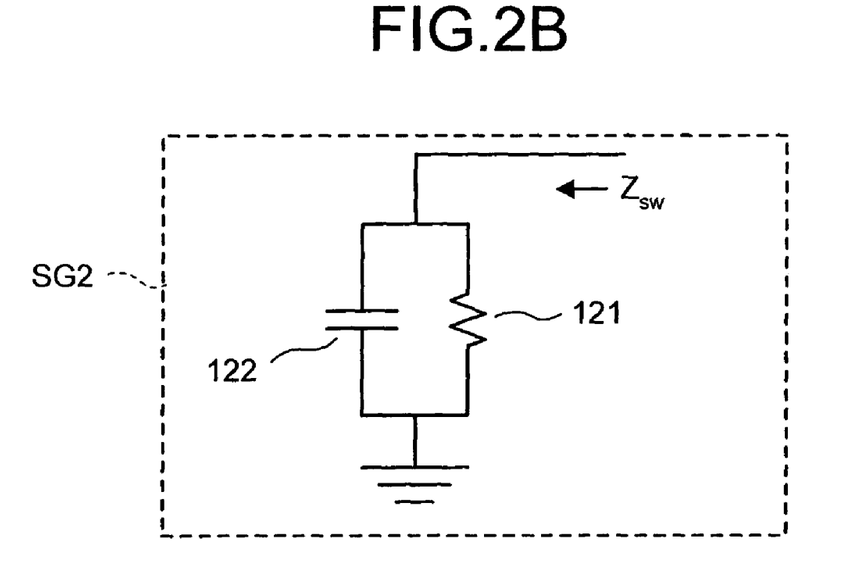

On the other hand, the input impedance $Z_{sw}$ of the stage SG2, when the switch emitter is an input node, is represented approximately by the impedance of the circuit that is connections of a resistor 121 and a capacitor 122 in parallel, as shown in FIG. 2B. The resistor 121 and capacitor 122 are a parasitic resistor and a parasitic capacitor of the transistors Q2 and Q3, respectively.

Resistance $R_{sw}$ of the resistor 121 is given by dividing $V_T$ that is thermal voltage (e.g. 26 mV) by the total amount of current in the transistors Q2 and Q3. Since the total amount of the current corresponds to the input signal $I_{in}$ the resistance $R_{sw}$ is represented by $V_T/I_{in}$ and thus the resistance $R_{sw}$ becomes relatively small. Moreover, capacitance $C_{sw}$ of the capacitor 122 is approximately the total base-emitter capacitance of the transistors Q2 and Q3. The impedance $Z_{sw}$ is given by:

$$Z_{sw} = \frac{1}{j\omega C_{sw} + \frac{1}{R_{sw}}} = \frac{R_{sw} - j\omega C_{sw} R_{sw}^2}{1 + \omega^2 C_{sw}^2 R_{sw}^2}. \quad (5)$$

Since $R_{sw}$ is generally small, the relation between $C_{sw}$, $R_{sw}$, and $\omega_{RF}$ can be expressed as follows:

$$1 > \omega_{RF} C_{sw} R_{sw} \quad (6).$$

The impedance $Z_{sw}$ is, in this case, represented approximately by:

$$Z_{sw} = R_{sw} - jR_{sw} \cdot \omega_{RF} C_{sw} R_{sw} \quad (7).$$

While the real part of this equation (7) is equivalent to the resistance value of the resistor 121, the absolute value of the imaginary part is smaller than the resistance value. The condition of conjugate power match for the frequency converter shown in FIG. 1 is that the relation between the input impedance $Z_{gm}$ of the stage SG1 with respect to the node N1 and the impedance $Z_{sw}$ of the stage SG2 is satisfied.

That is, the maximum power transfer requires $Z_{gm}=Z_{sw}^*$ where $Z_{sw}^*$ denotes the complex conjugate transpose of $Z_{sw}$.

Thus, the impedance matching unit 10 should have an impedance to meet this condition in view that the impedance $Z_{gm0}$ has capacitive degeneration as expressed by equation (4). If the impedance $Z_{gm}$ of the output of the impedance matching unit 10 is $Z_{sw}^*(Z_{gm}=Z_{sw}^*)$, the condition is equivalent to providing maximum current to the transistors Q2 and Q3 since the input impedance of the stage SG2 including the transistors Q2 and Q3 is predetermined. Providing maximum current is the same as increasing the conversion gain of the frequency converter.

Figure 3:
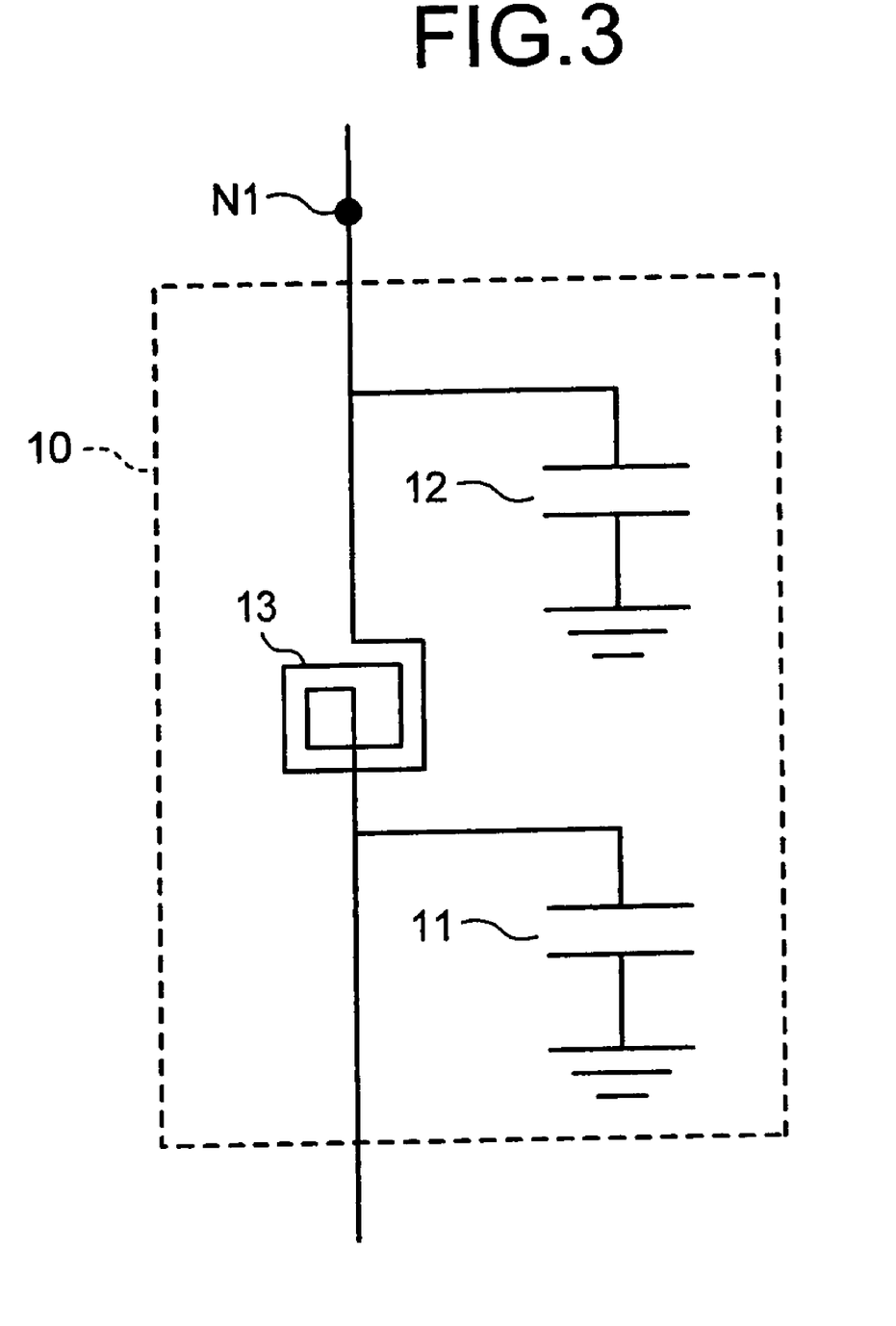
FIG. 3 is a circuit diagram that shows an example of an impedance matching unit of the frequency converter of FIG. 1.

FIG. 3 is a circuit diagram that shows an example of the detailed configuration of the impedance matching unit 10. The impedance matching unit 10 comprises two capacitors 11 and 12 and an inductor 13. These capacitors and the inductor are formed as an integrated circuit. The capacitor 11 is connected between the collector of the transistor Q1 and the earth, the capacitor 12 between the switch emitter and the earth, and the inductor 13 between the switch emitter and the collector of the transistor Q1.

Therefore, each capacitance of the capacitors 11 and 12 and the inductance of the inductor 13 can lead to the conjugate power match. That is, the real part of the impedance $Z_{gm}$ may be made to approach to the real part $R_{sw}$ of the impedance $Z_{sw}$ by selecting the capacitors 11 and 12 with appropriate capacitance and the inductor 13 with appropriate inductance. If the capacitors 11 and 12 and the inductor 13 are selected in this manner, even the imaginary part of the impedance $Z_{gm}$ approaches to the imaginary part $R_{sw}\omega_{RF}C_{sw}R_{sw}$ of the impedance $Z_{sw}$. As a result, the condition of conjugate power match for the circuit shown in FIG. 1, that is, $Z_{gm}=Z_{sw}^*$, is nearly met.

Figure 4:
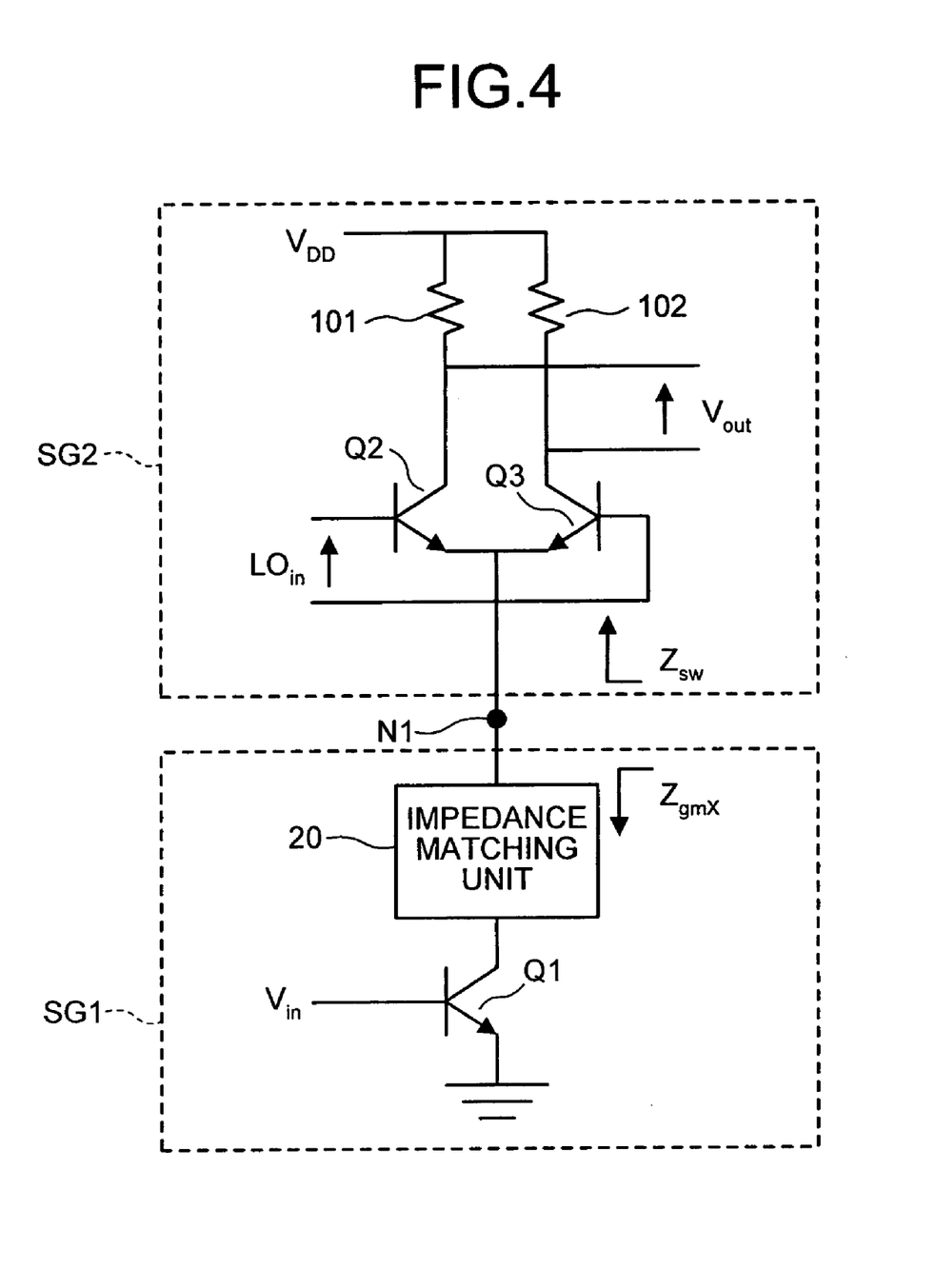
FIG. 4 is a circuit diagram of a frequency converter, which functions as a single balanced mixer, according to another embodiment of the present invention.

FIG. 4 is a circuit diagram of the frequency converter according to another embodiment of the present invention. The frequency converter according to this embodiment is, except that an impedance matching unit 20 is provided in place of the impedance matching unit 10, the same as the one shown in FIG. 1. The impedance matching unit 20 is not inductive across all frequencies. That is, the impedance matching unit 20 works inductively only with the frequencies of the input signal $V_{in}$.

When the impedance matching unit 20 has inductive reactance X, the impedance $Z_{gmX}$ of the transconductance amplifier stage SG1 is represented by:

$$Z_{gmx} = \frac{1}{\omega_{RF}C_{gm}} \cdot \frac{1}{\omega_{RF}C_{gm}R_{gm}} + j \cdot \left(X - \frac{1}{\omega_{RF}C_{gm}}\right). \tag{8}$$

As can be noticed from this equation (8), when the inductive reactance X is greater than $1/(\omega_{RF}C_{gm})$, the imaginary part of the impedance $Z_{gmx}$ becomes inductive. Thus, the impedance $Z_{gmX}$ becomes close to the complex conjugate of the impedance $Z_{sw}$. That is, the condition of conjugate power match for the circuit shown in FIG. 4, that is, $Z_{gmx}=Z^*_{sw}$, is nearly met.

Although it is not easy to design the inductive reactance X for achieving the maximum power transfer from the stages SG1 to SG2, the designing leads to the power transfer higher than the conventional frequency converter. That is, this manner makes the conversion gain of the frequency converter high, and thus an object of the present invention is achieved.

Figure 5:
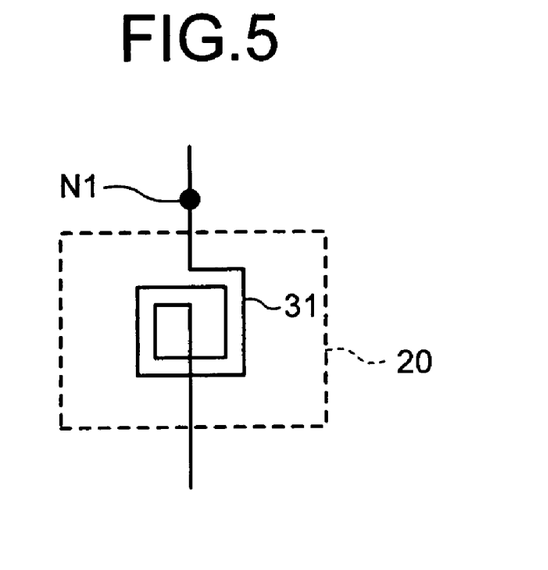
FIG. 5 is a circuit diagram that shows one example of an impedance matching unit of the frequency converter of FIG. 4.

FIG. 5 is a circuit diagram that shows one example of the configuration of the impedance matching unit 20. This impedance matching unit 20 comprises an inductor 31 that is formed as the IC. The inductor 31 is connected between the switch emitter and the collector of the transistor Q1.

Figure 6:
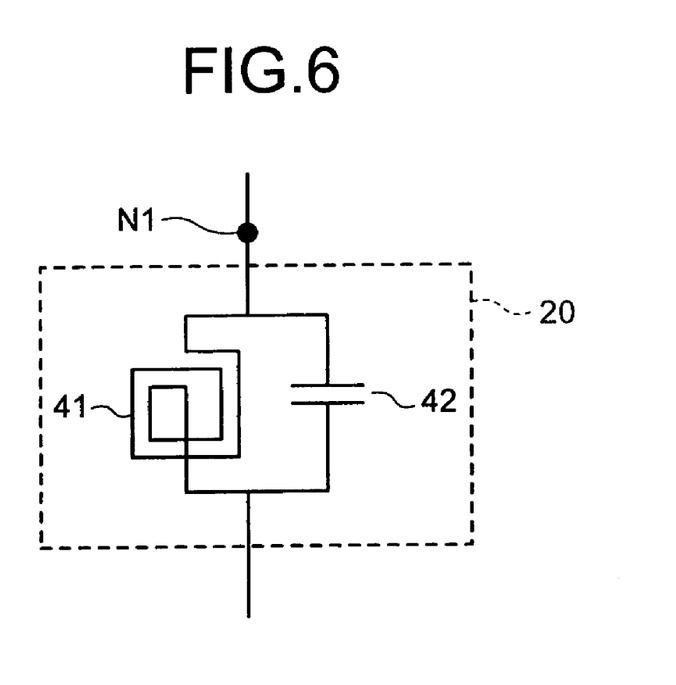
FIG. 6 is a circuit diagram that shows another example of the impedance matching unit of the frequency converter of FIG. 4.

FIG. 6 is a circuit diagram that shows another example of the configuration of the impedance matching unit 20. The impedance matching unit 20 shown in FIG. 4 comprises an inductor 41 and a capacitor 42 that are formed as the IC. The inductor 41 and capacitor 42 are connected between the switch emitter and the collector of the transistor Q1 and behave as a parallel resonant circuit.

The impedance $Z_x$ of the parallel resonant circuit is represented by:

$$Z_x = j \cdot \frac{1}{\frac{1}{\omega L_x} - \omega C_x}, \tag{9}$$

where $L_x$ is the inductance of the inductor 41 and $C_x$ is the capacitance of the capacitor 42.

From this equation (9), it can be noted that the parallel resonant circuit behaves as inductive element when receiving a signal which has a frequency smaller than a resonance frequency $\omega_X=1/(L_xC_x)^{1/2}$. That is, when an input signal $V_{in}$ having an angular frequency $\omega_{RF}$ smaller than the resonance frequency $\omega_X$ is input, the power transfer from stages SG1 to SG2 becomes higher than the conventional frequency converter.

When such an input signal $V_{in}$ is input, the impedance $Z_{gmX}$ of the stage SG1 which comprises the parallel resonant circuit and the transistor Q1 is represented by:

$$Z_{gmx} = \frac{1}{\omega_{RF}C_{gm}} \cdot \frac{1}{\omega_{RF}C_{gm}R_{gm}} + j \cdot \left\{\frac{1}{\frac{1}{\omega_{RF}L_x} - \omega_{RF}C_x} - \frac{1}{\omega_{RF}C_{gm}}\right\}. \tag{10}$$

In this equation (10), since the $1/\{1/(\omega_{RF}L_x)-\omega_{RF}C_x\}$ term can exhibit positive value, the conversion gain of the frequency converter becomes high.

Figure 7:
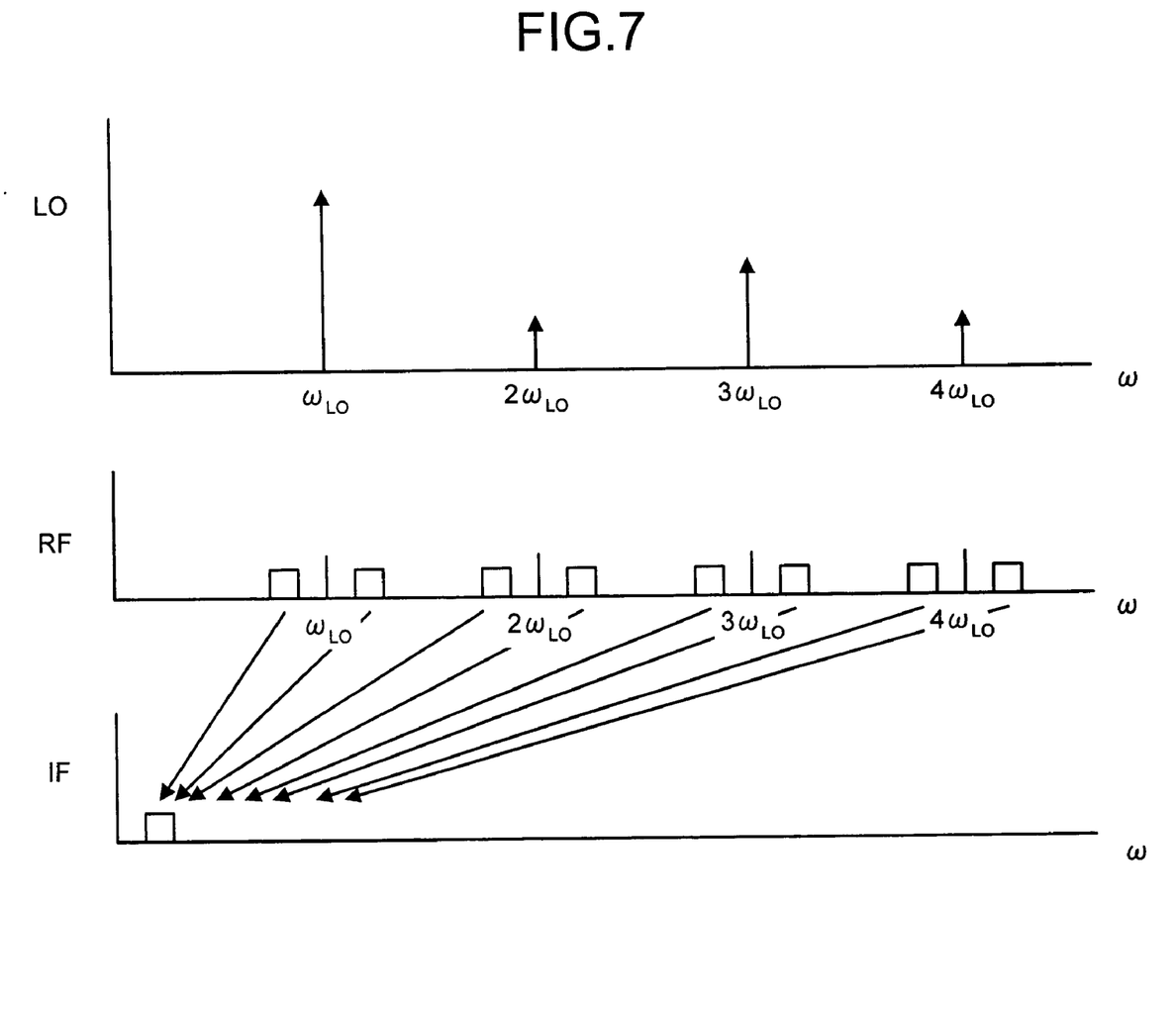
FIG. 7 explains noise depending on converted frequency.

FIG. 7 shows spectra of the local oscillator signal, spectra of the RF signal that is the target of frequency conversion, and an IF signal band that results from the frequency conversion. As shown in FIG. 7, there are two RF bands, $\omega_{LO}+\omega_{IF}$ and $\omega_{LO}-\omega_{IF}$, which are converted into an IF signal band by the local oscillator signal of the angular frequency $\omega_{LO}$, where $\omega_{IF}$ is the angular frequency of the IF signal. Similarly, the angular frequencies $2\omega_{LO}$, $3\omega_{LO}$, $4\omega_{LO}$, and $n\omega_{LO}$ (not shown), which are the harmonic of the angular frequency $\omega_{LO}$, lead to RF bands $2\omega_{LO}+\omega_{IF}$ and $2\omega_{LO}-\omega_{IF}$, $3\omega_{LO}+\omega_{IF}$ and $3\omega_{LO}-\omega_{IF}$, $4\omega_{LO}+\omega_{IF}$ and $4\omega_{LO}-\omega_{IF}$, and $n\omega_{LO}+\omega_{IF}$ and $n\omega_{LO}-\omega_{IF}$ (not shown), respectively, where n is an integer number more than four.

Of these harmonic frequencies, the angular frequency $3\omega_{LO}$ generally has the highest spectrum since the local oscillator signal of the single balanced mixer is a differential signal. This means that, the noise figure of the frequency converter may be reduced by reducing the noise contribution from the RF bands $3\omega_{LO}+\omega_{IF}$ and $3\omega_{LO}-\omega_{IF}$.

The impedance matching unit 10 shown in FIGS. 1 and 3 respectively maximizes power transferred from the stages SG1 to SG2 with respect to the RF bands $\omega_{LO}+\omega_{IF}$ and $\omega_{LO}-\omega_{IF}$, and reduces the power transfer with respect to the other frequency bands.

That is, the impedance matching unit 10 reduces the highest noise contribution from the harmonic frequencies (that is, the noise contribution from the RF bands $3\omega_{LO}+W_{IF}$ and $3\omega_{LO}-\omega_{IF}$). This means that the frequency converter relating to the present invention achieves low noise figure.

The impedance matching unit 20, which has inductive degeneration with respect to only the frequencies of the input signal $V_{in}$, shown in FIGS. 4 to 6 respectively also reduces the highest noise contribution from the harmonic frequencies, and thus achieves low noise figure.

Particularly, the frequency converter shown in FIG. 6 allows, when the resonance frequency $\omega_X$ of the parallel resonant circuit (parallel connections of the inductor 41 and capacitor 42) is set at $3\omega_{LO}+\omega_{IF}$ and $3\omega_{LO}-\omega_{IF}$, the noise transfer to become infinitesimal in that frequency, and thus can have excellent low noise performance.

That is, setting the resonance frequency at approximately $3\omega_1 \pm \omega_2$ leads to low noise performance, where $\omega_1$ is the local oscillator frequency and $\omega_2$ is a desired output frequency. The resonance frequency may be set at the frequency $3\omega_1 \pm \omega_2$ with acceptable error resulting at the designing stage of the frequency converter. Even if the resonance frequency is set in this way, the conversion gain improves due to inductivity of the impedance matching unit 20 with respect to the desired RF band.

Moreover, the resonance frequency $\omega_X$ of the parallel circuit may be set equal to or less than $2\omega_{LO}$ to obtain high conversion gain and low noise figure. However, it is preferable that the resonance frequency $\omega_X$ is not very low. Generally, the quality of the IC is uneven. If the resonance frequency $\omega_X$ is very low, the resonance frequency $\omega_X$ is greatly affected by the unevenness of the quality of the IC and results into lower accuracy of the resonance frequency $\omega_X$. Therefore, if the resonance frequency $\omega_X$ is very low, it is impossible to obtain the high conversion gain and low noise that have been calculated at the design stage.

How the uneven quality of the IC affects the impedance of the parallel resonant circuit will be described next. The uneven quality of the IC results from uneven capacitances of the capacitors and thus the input impedance $Z_x$ of the parallel resonant circuit becomes uneven.

Since the intermediate frequency is generally smaller than the local oscillator frequency, it is assumed $2\omega_{LO}+\omega_{IF} \approx 2\omega_{LO}$ or $2\omega_{LO}-\omega_{IF} \approx 2\omega_{LO}$, for easy understanding. The resonance frequency $\omega_X$ of the parallel resonant circuit is represented by $1/(L_X C_X)^{1/2}$ as expressed by equation (9). When the capacitance of the capacitor 42 is $C_X(1+y)$ where y indicates degree of unevenness of the capacitance of the capacitor 42, the resonance frequency $\omega_X$ is approximately represented by:

$$\omega_X = \frac{1}{\sqrt{L_X C_X (1+y)}} \approx \frac{1-\frac{y}{2}}{\sqrt{L_X C_X}}.$$

Moreover, the angular frequency $\omega_{RF}$, when being $1/N$ of the resonance frequency $\omega_X$ where N is an integer, is represented by:

$$\omega_{RF} \approx \frac{1-\frac{y}{2}}{N\sqrt{L_X C_X}}.$$

Therefore, the impedance $Z_X$ with respect to the angular frequency $\omega_{RF}$ is approximately represented by:

$$Z_X(\omega_{RF}) \approx \frac{j}{\left(N-\frac{1}{N}\right)\sqrt{\frac{L_X}{C_X}} \cdot \left\{1+\frac{y}{2} \cdot \frac{N+\frac{1}{N}}{N-\frac{1}{N}}\right\}}, \quad (11)$$

where N is also the ratio of the resonance frequency to the RF. From this equation (11), when N has a considerably large value, the varying of the impedance $Z_X$ against the degree of unevenness y becomes small. For example, $(N+1/N)/(N-1/N)=1.67$ for $N=2$, and $(N+1/N)/(N-1/N)=1.08$ for $N=5$. As a result, an increase in the value of N leads to decrease in the dependence of the unevenness of the quality of the capacitor 42. For example, if the maximum degree of unevenness of capacitor 42 is 0.5 (i.e. $y=0.5$), then the impedance $Z_X=0.7Z_{X0}$ for $N=2$ where $Z_{X0}$ is the impedance of the parallel resonant circuit for $y=0$, and if $y=-0.5$, then $Z_X=1.7Z_{X0}$.

Accordingly, the impedance $Z_X$ of the parallel resonant circuit is less than twice the impedance $Z_{X0}$ of the parallel resonant circuit without uneven quality. This meets the requirement of the conventional design margin of the IC. Since the impedance $Z_X$ may be equal to or higher than twice the impedance $Z_{X0}$ when N is less than two, the expected high conversion gain and low noise figure are not necessarily achieved. Therefore, in view of the unevenness in the quality of the IC, it is preferable that the resonance frequency of the parallel resonant circuit is higher than twice the RF.

In general, the IC is designed in such a manner that there is little effect even if the unevenness in the quality doubles. Moreover, since the Q factor of the inductor formed as the IC is lower than that of the discrete inductor, the frequency characteristic of the parallel resonant circuit does not have any steep slopes. This lower Q factor results from a higher value of the wiring resistance formed in the IC.

One aim of this invention is to reduce the noise that results from specific harmonic frequencies. Consequently, as far as this aim is achieved, the resonance frequency is not necessarily limited to only one frequency. In other words, the noise can be reduced even if the resonance frequency is set at an arbitrary frequency in the band between $2\omega_1-\omega_2$ and $3\omega_1-\omega_2$. The resonance frequency can be set at an arbitrary frequency in the band between $2\omega_1-\omega_2$ and $3\omega_1-\omega_2$, because, the frequency characteristic of the IC formed inductor has no steep slopes. When the resonance frequency is set at an arbitrary frequency in the band between $2\omega_1-\omega_2$ and $3\omega_1-\omega_2$, since the resonance frequency is not assigned in the band of the third harmonic frequency, the noise performance is poor. However, this noise performance is higher than the noise performance of the conventional frequency converter without the parallel resonant circuit like this.

Figure 8:
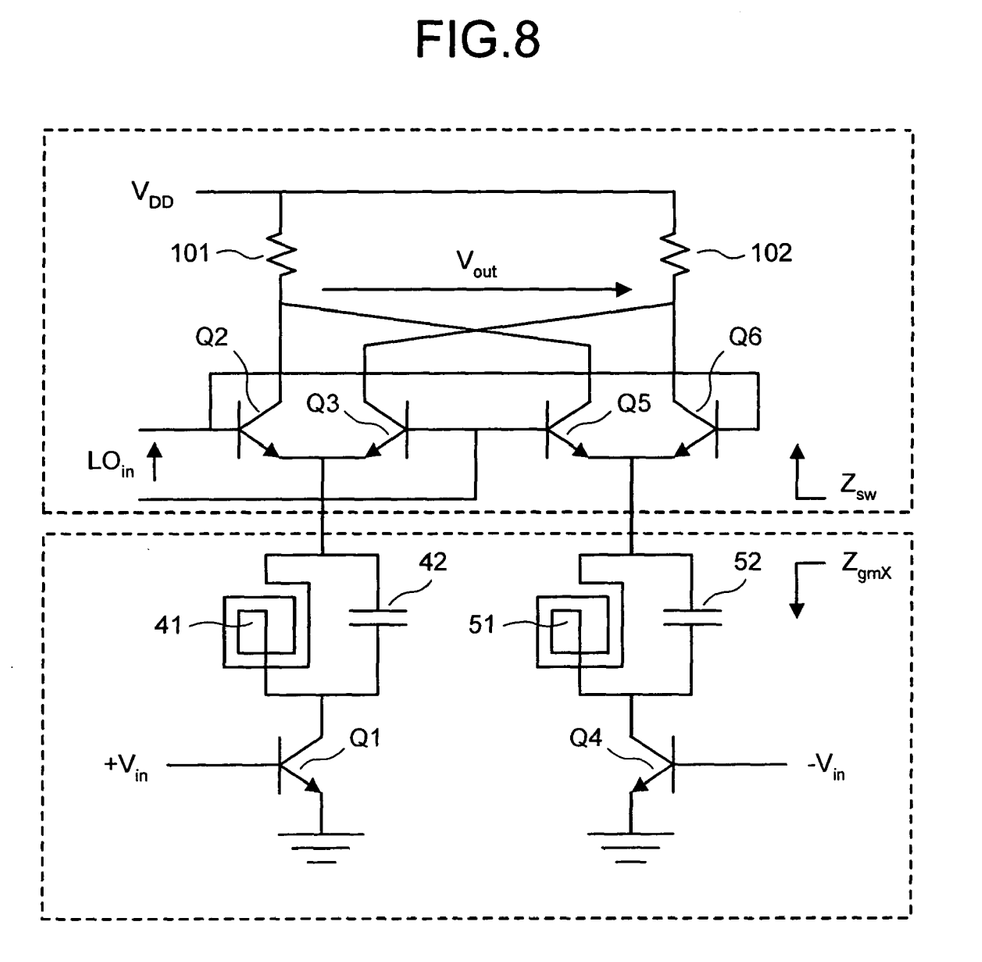
FIG. 8 is a circuit diagram of a frequency converter, which functions as a double balanced mixer, according to another embodiment of the present invention.

FIG. 8 is a circuit diagram of the frequency converter according to another embodiment of the present invention. Particularly, the circuit diagram shows that the impedance matching unit (i.e. the parallel resonant circuit) shown in FIG. 6 is added to the conventional double balanced mixer. The double balanced mixer generally comprises two single balanced mixers that are connected in parallel. The double balanced mixer also works in the same manner as the single balanced mixer, except that an input signal of one mixer and an input signal of the other mixer are in opposite phase to each other. In other words, the double balanced mixer has a differential input.

Therefore, as shown in FIG. 8, the frequency converter according to this embodiment comprises an NPN transistor Q4, a parallel resonant circuit (parallel connections of an inductor 51 and a capacitor 52) as shown in FIG. 6, and NPN transistors Q5 and Q6 in addition to each element shown in FIGS. 4 and 6. Precisely, the emitter of the transistor Q4 is connected to the earth, and the input signal $-V_{in}$, which is in opposite phase to the input signal $+V_{in}$ at the transistor Q1, is input to the base. The transistors Q5 and Q6 are connected to each other at its emitter. The base of the transistor Q5 is connected to the base of the transistor Q3 and the base of the transistor Q6 is connected to the base of the transistor Q2. The collector of the transistor Q5 is connected to the collector of the transistor Q2 and the collector of the transistor Q6 is connected to the collector of the transistor Q3. The parallel resonant circuit, which comprises the inductor 51 and capacitor 52, is connected between the collector of the transistor Q4 and the emitters of the transistors Q5 and Q6.

This embodiment achieves the high conversion gain and low noise figure for a differential signal in the same manner as the described above for FIG. 6.

Figure 9:
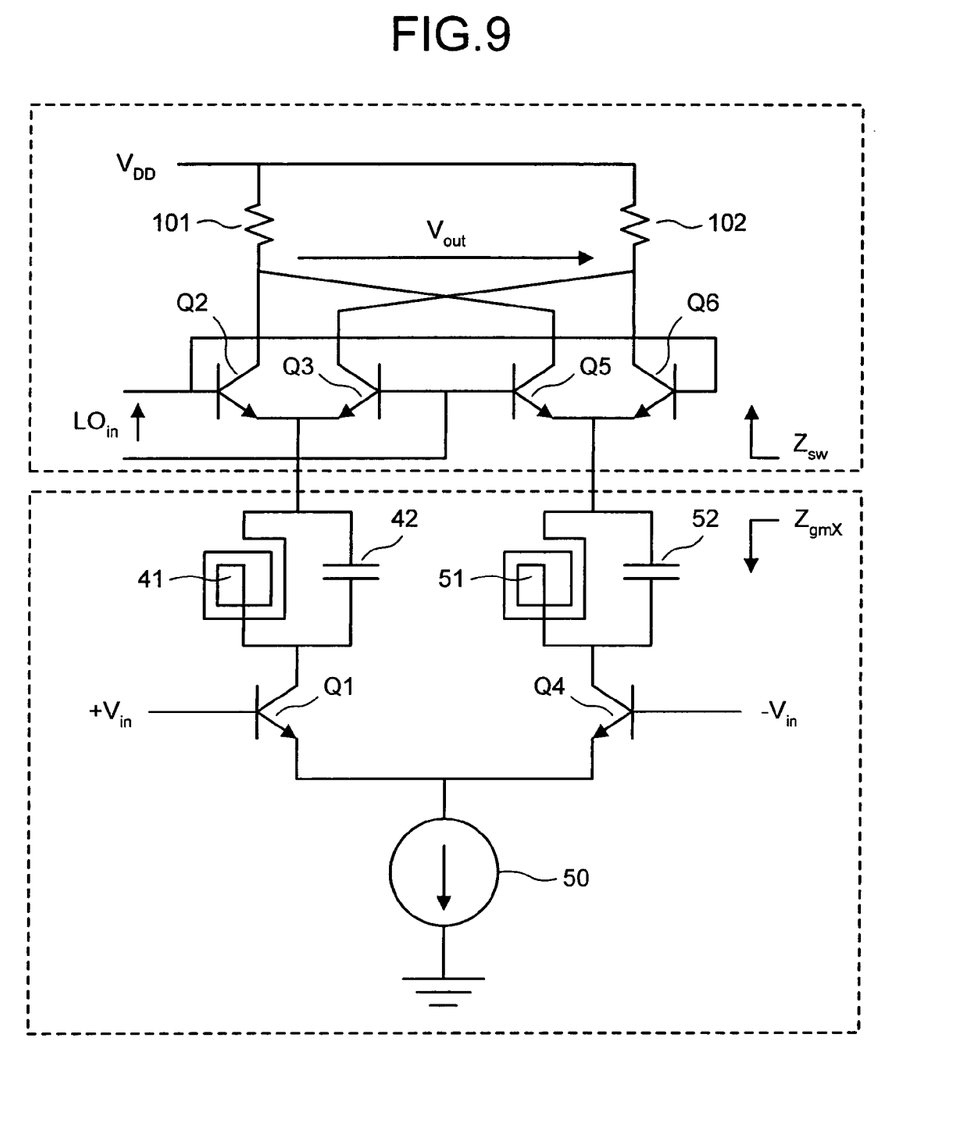
FIG. 9 is a circuit diagram that shows a variant of the frequency converter of FIG. 8.

FIG. 9 is a circuit diagram that shows a variant of the frequency converter of FIG. 8. This circuit comprises a tail current source 50 in addition to the circuit of FIG. 8. The tail current source 50 is connected between the emitters of the transistors Q1 and Q4 and the earth. As a result, a differential amplifier is achieved by a differential pair that is composed of the transistors Q1 and Q4. This frequency converter can also work in the same way as one shown in FIG. 8, and thus achieves high conversion gain and low noise figure.

The frequency converters according to the present invention serve as the down-converter and may be employed in the radio receiver. The frequency converter may also serve as the up-converter and may be employed in the radio transmitter. When the frequency converter is employed as the up-converter, the input signal at the transconductance amplifier stage SG1 is the IF signal, and has a higher frequency than twice the resonance frequency of the parallel resonant circuit.

When the frequency converter is employed in the radio transmitter the output signal comes to have a frequency $\omega_{IF}+\omega_{LO}$, the frequency component to be the conversion target is $2\omega_{LO}-\omega_{IF}$, if the input signal is converted by the third harmonic $3\omega_{LO}$ of the local oscillator signal. Therefore, setting the resonance frequency of the parallel resonant circuit at $2\omega_{LO}-\omega_{IF}$ allows the frequency converter to have an excellent noise performance.

On the other hand, if the input signal is converted by the third harmonic $3\omega_{LO}$ of the local oscillator signal, and thus the output signal comes to have a frequency $\omega_{LO}-\omega_{IF}$, the frequency component to be the conversion target is $2\omega_{LO}+\omega_{IF}$. Even in this case, setting the resonance frequency of the parallel resonant circuit at $2\omega_{LO}+\omega_{IF}$ allows the frequency converter to have an excellent noise performance.

That is, setting the resonance frequency at approximately $2\omega_1 \pm \omega_2$ leads to low noise performance, where we is the local oscillator frequency and $\omega_2$ is an input frequency. The resonance frequency may set at the frequency $2\omega_1 \pm \omega_2$ with acceptable error resulting from the design stage of the frequency converter.

A radio communication apparatus relating to the present invention is explained next. The radio communication apparatus includes the frequency converter according to any one of the embodiments described. This radio communication apparatus is employed in a radio communication terminal such as a mobile phone.

Figure 10:
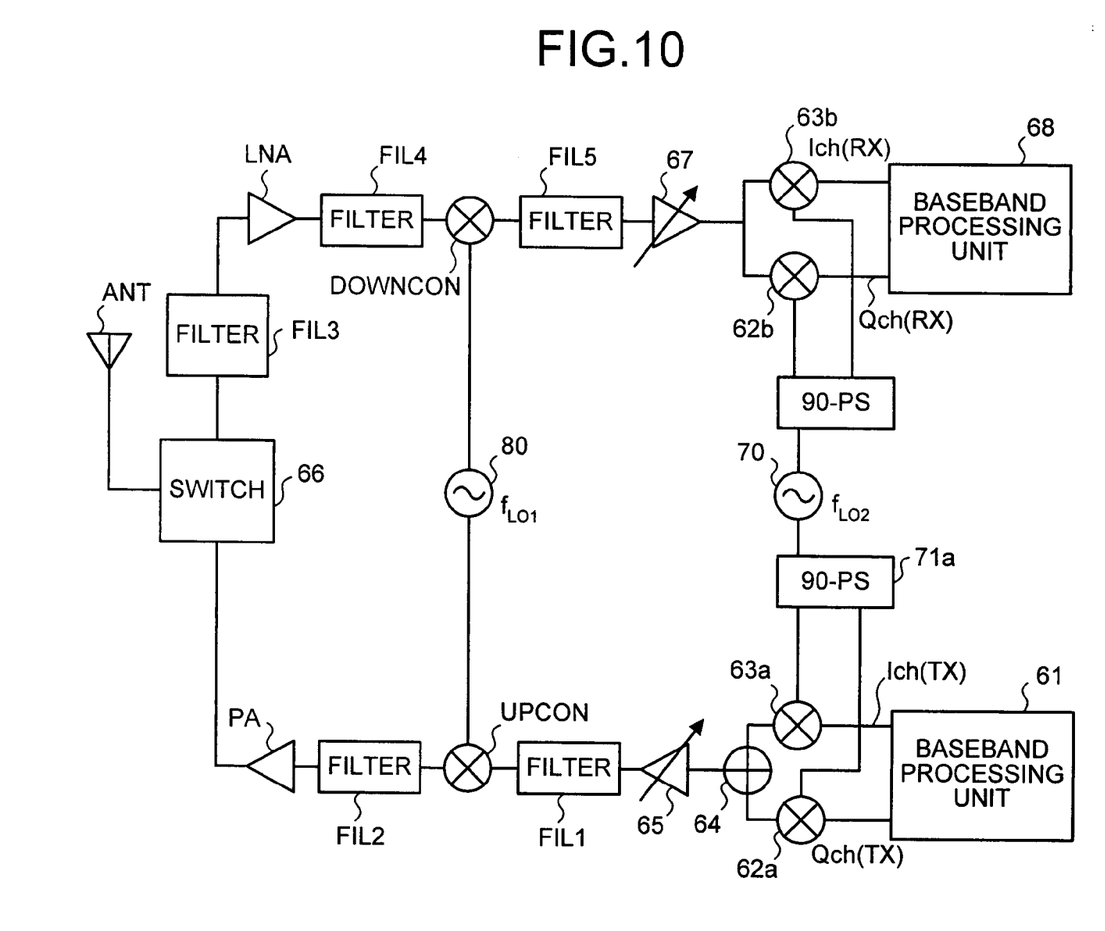
FIG. 10 schematically shows a radio communication apparatus according to one embodiment of the present invention.

FIG. 10 schematically shows the radio communication apparatus relating to the present invention. This radio communication apparatus employs the heterodyne system. It is assumed that this radio communication apparatus operates in the time division duplex (TDD) mode for switching between transmitting and receiving. However, this does not exclude any other communication mode in the radio communication apparatus.

When performing transmission, a baseband processing unit 61 for transmission outputs two orthogonal baseband signals Ich(TX) and Qch(TX) through an appropriate bandpass filter. The baseband signals Ich(TX) and Qch(TX) are generated by a baseband signal generator (not shown in the figure).

Next, these baseband signals Ich(TX) and Qch(TX) are input to a quadrature modulator that is composed of multipliers 62a, 63a and an adder 64. Thus, a second local oscillator signal with frequency $f_{LO2}$ is modulated. The second local oscillator signal is generated by a local oscillator 70 and is divided into two orthogonal signals by 90 degree phase shifter 71a. The two orthogonal signals are input to the quadrature modulator. The modulated signal from this quadrature modulator is the IF signal and is input to a variable gain amplifier 65.

The variable gain amplifier 65 adjusts the IF signal to a suitable level, based on a gain control signal from a controller (not shown in the figure). The IF signal from the variable gain amplifier 65, because of having unwanted harmonics, is input to an up-converter UPCON that is the frequency converter relating to the present invention via a filter FIL 1 (for low or band pass). The unwanted harmonics arise from the quadrature modulator and the variable gain amplifier 65.

The up-converter UPCON multiplies the IF signal and a first local oscillator signal with frequency $f_{LO1}$ and, generates two RF signals respectively with frequency $f_{LO1}+f_{LO2}$ and $f_{LO1}-f_{LO2}$. One of these RF signals is a desired signal and the other is an unwanted image signal. In this up-converter UPCON, the RF signal with frequency $f_{LO1}+f_{LO2}$ is the desired signal and $f_{LO1}-f_{LO2}$ is the image signal. The image signal is removed by an image removal filter FIL2. It is needless to say that the desired signal may be the RF signal with frequency $f_{LO1}-f_{LO2}$.

The desired signal is amplified up to a necessary power level by a power amplifier PA, then supplied to an antenna ANT through a switch 66, which selects between transmission and reception, and transmitted as a radio wave.

On the other hand, when performing reception, the switch 66 receives an RF signal via the antenna ANT. The received RF signal is input to a low-noise amplifier LNA through a band-pass filter FIL3. The RF signal is amplified by the low-noise amplifier LNA and input to a down-converter DOWNCON through an image removal filter FIL4. This down-converter DOWNCON is the frequency converter relating to the present invention.

The down-converter DOWNCON multiplies the RF signal and the first local oscillator signal with frequency $f_{LO1}$ and thus converts the RF signal into the IF signal. The IF signal from the down-converter DOWNCON passes through a band-pass filter FIL5, and then input to a quadrature demodulator that is composed of multipliers 62b, 63b and a divider (not shown) via a variable gain amplifier 67. The quadrature demodulator receives the second local oscillator signal with frequency $f_{LO2}$ and outputs signals Ich(RX) and Qch(RX). The signals Ich(RX) and Qch(RX) from this quadrature demodulator are input to a baseband processing unit 68 for reception. As a result, the RF signal is demodulated.

It is mentioned above that the transistors in the frequency converter according to the above embodiments are NPN bipolar transistors. However, it is needless to say that the transistors could be PNP bipolar transistors or metal oxide semiconductor transistors.

As explained above, the frequency converter and radio communication apparatus according to the present invention achieve high conversion gain and low noise without increase in current consumption.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A frequency converter comprising:
   a first transconductance unit that outputs a first output signal based on a first input signal having a first frequency;
   a first inductor through which the first output signal passes;
   a first current switching unit that converts the first output signal passing through the first inductor to a second output signal having a second frequency based on a local oscillator signal, the first inductor being connected between the first transconductance unit and the first current switching unit;
   a second transconductance unit that outputs a third output signal based on a second input signal having a phase that is opposite to a phase of the first input signal;
   a second inductor through which the third output signal passes; and
   a second current switching unit that converts the third output signal passing through the second inductor to the second output signal based on the local oscillator signal, the second inductor being connected between the second transconductance unit and the second current switching unit.

2. The frequency converter according to claim 1, further comprising a current source that is commonly connected to the first and second transconductance units.

3. The frequency converter according to claim 1, wherein the first and second inductors are formed as a part of a monolithic integrated circuit.

4. The frequency converter according to claim 1, further comprising:
   a first capacitor connected to the first inductor in parallel; and
   a second capacitor connected to the second inductor in parallel.

5. The frequency converter according to claim 4, wherein the first inductor, the second inductor, the first capacitor, and the second capacitor are formed as a part of a monolithic integrated circuit.

6. The frequency converter according to claim 5, wherein the first inductor and the first capacitor constitute a first parallel resonant circuit, and
   the second inductor and the first capacitor constitute a second parallel resonant circuit.

7. The frequency converter according to claim 6, wherein the first parallel resonant circuit and the second parallel resonant circuit each have a resonance frequency that is two times or more of a frequency of the local oscillator signal.

8. The frequency converter according to claim 6, wherein the first parallel resonant circuit and the second parallel resonant circuit each have a resonance frequency that is represented approximately by $3\omega_1 \pm \omega_2$ where $\omega_1$ is a frequency of the local oscillator signal and $\omega_2$ is the second frequency.

9. The frequency converter according to claim 6, wherein the first parallel resonant circuit and the second parallel resonant circuit each have a resonance frequency that is represented approximately by $2\omega_1 \pm \omega_2$ where $\omega_1$ is a frequency of the local oscillator signal and $\omega_2$ is the second frequency.

10. The frequency converter according to claim 1, wherein
    the first transconductance unit includes a first transistor, the first input signal being input to a base of the first transistor, the first output signal being output from a collector of the first transistor, the collector of the first transistor being connected to one terminal of the first inductor,
    the first current switching unit includes second and third transistors, emitters of the second and third transistors being connected to another terminal of the first inductor, the local oscillator signal being applied between bases of the second and third transistors,
    the second transconductance unit includes a fourth transistor, the second input signal being input to a base of the fourth transistor, the third output signal being output from a collector of the fourth transistor, the collector of the fourth transistor being connected to one terminal of the second inductor, and
    the second current switching unit includes fifth and sixth transistors, emitters of the fifth and sixth transistors being connected to another terminal of the second inductor, a base of the first transistor being connected to a base of the sixth transistor, a base of the second transistor being connected to a base of the fifth transistor.

11. The frequency converter according to claim 1, further comprising:
    a first capacitor, one terminal of the first capacitor being connected to one terminal of the first inductor, another terminal connected to the earth;
    a second capacitor, one terminal of the second capacitor being connected to another terminal of the first inductor, another terminal of the second capacitor being connected to the earth;
    a third capacitor, one terminal of the third capacitor being connected to one terminal of the second inductor, another terminal of the third capacitor being connected to the earth; and
    a fourth capacitor, one terminal of the fourth capacitor being connected to another terminal of the second inductor, another terminal of the fourth capacitor being connected to the earth;.

12. A radio communication apparatus comprising:
    a first frequency converter including
       a first transconductance unit that outputs a first output signal based on a first input signal having a first frequency;
       a first inductor through which the first output signal passes;

a first current switching unit that converts the first output signal passing through the first inductor to a second output signal having a second frequency based on a local oscillator signal, the first inductor being connected between the first transconductance unit and the first current switching unit;

a second transconductance unit that outputs a third output signal based on a second input signal having a phase that is opposite to a phase of the first input signal;

a second inductor through which the third output signal passes; and a second current switching unit that converts the third output signal passing through the second inductor to the second output signal based on the local oscillator signal, the second inductor being connected between the second transconductance unit and the second current switching unit, a second frequency converter including a third transconductance unit that outputs a fourth output signal based on a third input signal having the second frequency;

a third inductor through which the fourth output signal passes;

a third current switching unit that converts the fourth output signal the third inductor to a fifth output signal having the first frequency based on the local oscillator signal, the third inductor being connected between the third transconductance unit and the third currently switching unit;

a fourth transconductance unit that outputs a fifth output signal based on a fourth input signal having a phase that is opposite to a phase of the third input signal;

a fourth inductor through which the fifth output signal passes; and a fourth current switching unit that converts the fifth output signal passing through the fourth inductor to the fourth output signal based on the local oscillator signal, the fourth inductor being connected between the fourth transductance unit and the fourth current switching unit;

a signal generating unit that generates the first and second input signals, outputs the first input signal to the first transconductance unit of the first frequency converter, and outputs the second input signal to the second transconductance unit of the second frequency converter;

a receiving unit that receives a signal output from any one of the third and fourth current switching units of the second frequency converter; and an antenna that receives a signal corresponding to any one of the third and fourth input signals, outputs the signal received to any one of the third and fourth transconductance units of the second frequency converter, and transmits a signal output from any one of the first and second current switching units of the first frequency converter.

* * * * *